United States Patent
Braun et al.

(10) Patent No.: US 6,272,950 B1
(45) Date of Patent: Aug. 14, 2001

(54) DRIVE TRAIN FOR A VEHICLE AND METHOD OF CONTROLLING A DRIVE TRAIN

(75) Inventors: Tom Braun, Plymouth, MN (US); Lloyd Taylor, Aukrug (DE)

(73) Assignees: Sauer-Danfoss Inc., Ames, IA (US); Merlo Spa Industria Metalmeccanica (IT)

( * ) Notice: Subject to any disclaimer, the term of this patent is extended or adjusted under 35 U.S.C. 154(b) by 0 days.

(21) Appl. No.: 09/493,909

(22) Filed: Jan. 28, 2000

(51) Int. Cl.$^7$ .................................................. F16H 47/00
(52) U.S. Cl. ......................................... 74/731.1; 74/733.1
(58) Field of Search .................................. 74/339, 731.1, 74/732.1, 733.1

(56) References Cited

U.S. PATENT DOCUMENTS

| | | | |
|---|---|---|---|
| 4,187,739 | * | 2/1980 | Hamma et al. ...................... 74/733.1 |
| 4,291,592 | * | 9/1981 | Meyerle et al. ........................ 475/81 |
| 4,766,779 | * | 8/1988 | Massy ................................. 74/731.1 |
| 4,939,954 | * | 7/1990 | Walzer et al. ....................... 74/733.1 |
| 4,947,687 | * | 8/1990 | Martini et al. ...................... 74/733.1 |
| 5,193,416 | * | 3/1993 | Kanayama .......................... 74/733.1 |
| 5,678,462 | * | 10/1997 | Bausenhart et al. ................ 74/731.1 |
| 5,678,463 | * | 10/1997 | Brambilla et al. .................. 74/731.1 |
| 6,080,074 | * | 6/2000 | Ulbrich et al. .................. 74/731.1 X |
| 6,106,427 | * | 8/2000 | Nikolaus et al. ............... 74/732.1 X |

FOREIGN PATENT DOCUMENTS

0513382 * 11/1992 (EP) ..................................... 74/731.1

* cited by examiner

Primary Examiner—Charles A Marmor
Assistant Examiner—Roger Pang
(74) Attorney, Agent, or Firm—Zarley, McKee, Thomte, Voorhees & Sease, PLC

(57) ABSTRACT

A drive train comprises an internal combustion engine, a clutchless gearbox, which can be shifted by means of an electronic control unit and by means of actuating devices, without a mechanical synchronizing device, and a hydrostatic gearbox with a hydraulic pump and a hydraulic motor, which are connected in a closed circuit. The rotational speed of the hydraulic motor being controllable in dependence on a control signal to the adjusting device of the hydraulic pump and/or to the adjusting device of the hydraulic motor. The control unit calculates the control signal by means of setpoint input via an accelerator pedal or as a function of the rotational drive speed of the internal combustion engine, with shifting of the transmission stages being possible by means of the actuating devices. The control unit controls the adjusting device of the hydraulic pump as well as the actuating devices for the gearbox for the electronic synchronization of the latter by means of a characteristic curve which represents the speed ratio of the hydraulic motor to the hydraulic pump in dependence on an actuating signal to the adjusting device of the hydraulic pump for a loadfree state of the gearbox. For this purpose, in the method of controlling the drive train, the control unit calculates a maximum achievable synchronous speed of the hydraulic motor by means of a characteristic curve which represents the speed ratio of the hydraulic motor to the hydraulic pump in dependence on an actuating signal to the adjusting device of the hydraulic pump and/or to the adjusting device of the hydraulic motor for a loadfree state of the gearbox.

13 Claims, 2 Drawing Sheets

DRIVE TRAIN FOR A VEHICLE AND METHOD OF CONTROLLING A DRIVE TRAIN

BACKGROUND OF THE INVENTION

It is generally necessary in the operation of vehicle drives because of relatively narrow usable speed range of internal combustion engines, transmission and gear devices which allow load-dependent or speed-dependent operation of the drive train are used with such engines. Since, on account of their performance characteristics, internal combustion engines can in principle only provide a low torque at low rotational speeds, it is also necessary to provide a separating device or clutch which makes possible the starting of a vehicle or running of an engine. Furthermore, in particular in the case of vehicles, synchronizing devices which allow shifting between different transmission stages during operation or during the journey are conventionally used in the gearbox. Corresponding gearboxes are of a complex structural design.

Mechanical, manually operated gearboxes without a clutch or synchronizing device are also used in vehicles with internal combustion engines, or in combination with hydrostatic gearboxes, where the hydraulic pump and hydraulic motor of which are connected in a closed circuit. The hydrostatic gearbox serves in this case merely as a clutch or torque converter. When synchronizing devices are absent, it is often necessary to stop the vehicle for changing the transmission ratio, or at least reducing the speed to a minimum in order to avoid considerable mechanical wearing of the manually operated gearbox.

It is therefore the object of the present invention to provide a drive train in which the hydrostatic gearbox acts together with an electronic control unit to make rapid and dependable separation or synchronized gear changing possible in a simple way without further coupling or synchronizing devices in the gearbox. At the same time, the object of the method of controlling the drive train is to control the change between different transmission ratios of the gearbox during the journey by means of digital electronics.

SUMMARY OF THE INVENTION

A drive train for a vehicle has an internal combustion engine, a clutchless gearbox, which can be shifted by means of an electronic control unit and by means of actuating devices and has at least two transmission stages, and a hydrostatic gearbox. The shiftable clutchless gearbox may be designed in particular without additional synchronizing devices. The hydrostatic gearbox comprises a hydraulic pump and a hydraulic motor, which are connected in a closed circuit. The arrangement is such that the rotational speed of the hydraulic motor is controllable in dependence on a control signal to the adjusting device of the hydraulic pump and/or to the adjusting device of the hydraulic motor. The control unit calculates the control signal by means of setpoint input via an accelerator pedal or as a function of the rotational drive speed of the internal combustion engine, with shifting of the transmission stages being possible by means of the actuating devices. The control unit is designed such that it controls the adjusting device of the hydraulic pump as well as the actuating devices for the shiftable clutchless gearbox for the electronic synchronization of the latter by means of a characteristic curve. This characteristic curve represents the speed ratio of the hydraulic motor to the hydraulic pump in dependence on an actuating signal to the adjusting device of the hydraulic pump for a loadfree state of the gearbox.

The configuration allows a synchronization of the shiftable clutchless gearbox in a simple and reproducible way without the use of conventional synchronizing devices. The hydrostatic gearbox compensates for a sudden change in the transmission stage occurring during shifting. Consequently, a change between different transmission ratios of the gearbox during the journey by means of the corresponding digital electronics is also possible.

The control unit is designed such that the characteristic curve, which can be determined in the form of a learning curve as a setup before putting the drive train into operation, can be stored there. For determining the learning curve, the actuating signals to the adjusting devices of the hydraulic pump and/or hydraulic motor are continuously increased until the maximum speed ratio of the hydraulic motor to the hydraulic pump is reached. This determinability and storability of the characteristic curve in the control unit allows simple and reproducible controlling of the drive train.

It is preferred that a proportional valve to be provided, to adjust the pivoting angle of the hydraulic pump to adjust its volumetric delivery. The required actuating signal is supplied by the control unit on the basis of a setpoint input via an accelerator pedal or in dependence on the drive speed of the internal combustion engine, which can be picked up by means of a first speed sensor.

For ensuring the function of the drive train, it is preferred for a switch which delivers to the control unit a signal as to whether the gearbox is in a neutral position or whether a transmission stage (gear) is engaged to be provided on the shiftable gearbox.

It is preferred that for the actuating devices to be shifted, valves or electromagnets be activated by the control unit. They can be disengaged again by means of spring force as soon as a corresponding switching signal of the control unit is reset and the gearbox is brought by the control system into a loadfree state by the actuating signal as determined by the characteristic curve.

For the electronic synchronization of operation, a second speed sensor, for measuring the input speed of the gearbox, and a third speed sensor, for measuring the output speed of the gearbox, are provided in the region of the input shaft and output shaft, respectively, of the gearbox.

The method of controlling a drive train comprised of an internal combustion engine, a clutchless gearbox without a mechanical synchronizing device and a hydrostatic drive or a hydrostatic gearbox with a hydraulic pump, a hydraulic motor and a control unit, involves the control unit calculating a maximum achievable synchronous speed of the hydraulic motor. The appropriately electronically controlled hydrostatic gearbox is then used to compensate for the sudden change in the transmission stage. The calculation by the control unit takes place by means of a characteristic curve. The curve represents the speed ratio of the hydraulic motor to the hydraulic pump which are in dependence on an actuating signal to the adjusting device of the hydraulic pump and/or to the adjusting device of the hydraulic motor for a loadfree state of the gearbox.

This method of using a characteristic curve makes possible the optimum, dependable and rapid activation of the system with regard to the maximum possible speeds in the respective transmission ratios of the gearbox of the drive train by calculating the maximum possible synchronous speed of the hydraulic motor in dependence on the speed of the hydraulic pump.

It is preferred for the control unit to activate actuating devices for the transmission stages of the gearbox in a way corresponding to a desired operating point on the characteristic curve. Consequently, the control electronics can derive the actuating signal respectively required to operate the gearbox in a loadfree state for disengaging in a particularly simple and rapid manner on the basis of the current operating point on the characteristic curve.

It is particularly preferred in the method of controlling the drive train according to the invention to record the characteristic curve in the form of a learning curve as a set-up at least for each new hydrostatic drive or for each new hydrostatic gearbox. This makes possible an individual adaptation to the respective components used and consequently dependable functioning of the drive train.

In a preferred embodiment of the method, the respectively current transmission ratio of the gearbox during the journey is shifted into the neutral position, by de-activating a corresponding output of the control unit, and by bringing the gearbox into the loadfree state for a short time by changing the actuating signal to the adjusting device of the hydraulic pump.

It is particularly advantageous if, in the method of controlling a drive train, the output speed of the hydraulic motor is rapidly brought by the control system to a synchronous speed required for the desired transmission stage as dependent on the combustion engine speed. This is accomplished on the basis of an actuating signal which is derived from the characteristic curve and determines the pivoting angle of the hydraulic pump and/or hydraulic motor, when a neutral position of the gearbox is sensed. For the synchronization of the gearbox, the speed of the hydraulic motor is thus adapted by means of the adjustment to the chosen transmission ratio of the gearbox. The control electronics takes the actuating signal required for this purpose from the characteristic curve.

In the case of the drive train according to the invention and the method for controlling the drive train, a gear change can generally both take place automatically in dependence on the output speed of the gearbox and be initiated by a corresponding gear selection by the driver via switching inputs of the digital control unit. In this case, the electronic control unit checks at any time on the basis of the speed signals of the hydraulic pump, the hydraulic motor and the gearbox output shaft. This happens whether a gear change in automatic shifting mode is required, or is possible at all because of a manual gear selection when shifting down. The maximum achievable synchronous speed of the hydraulic motor to be taken into account in this case is calculated with the aid of the characteristic curve. The characteristic curve of the system designates the speed ratio of the hydraulic motor to the hydraulic pump in dependence on the actuating signal to the adjusting device of the hydraulic pump which determines the pivoting angle. This applies to the unloaded gearbox. The characteristic curve is recorded in the form of a learning curve as a set-up once only for a given drive train.

To be able to disengage the respectively current gear during the journey, the corresponding output of the electronic control unit is de-activated, and the gearbox is operated loadfree for a brief moment (about 100 ms) by means of the adjusting device. The control unit derives the information necessary for detecting the respective loading situation of the drive train from the characteristic curve. Depending on the loading situation, the required actuating signal for bringing the gearbox as quickly as possible into the loadfree state can be determined on the basis of the characteristic curve.

As soon as a switch signals the neutral position of the gearbox, the motor speed, i.e. the hydraulic-pump speed, and/or the speed ratio of the hydraulic pump to the hydraulic motor is brought by the control system to the synchronous speed required for the selected gear. This is done on the basis of the actuating signal or signals transmitted to the adjusting device or devices of the hydraulic pump and/or hydraulic motor. This takes about 300 ms. The corresponding actuating signal is derived from the learning curve. If the difference in speed is in a certain tolerance range, the control unit switches the actuating device of the selected gear by a corresponding switching signal. The switching operation is ended as soon as the switch, which also signals the neutral position of the gearbox, then indicates the engaged state of the gearbox. The average switching duration for a complete switching operation is around 500 ms.

DESCRIPTION OF THE PREFERRED EMBODIMENT OF THE INVENTION

Figure 1:
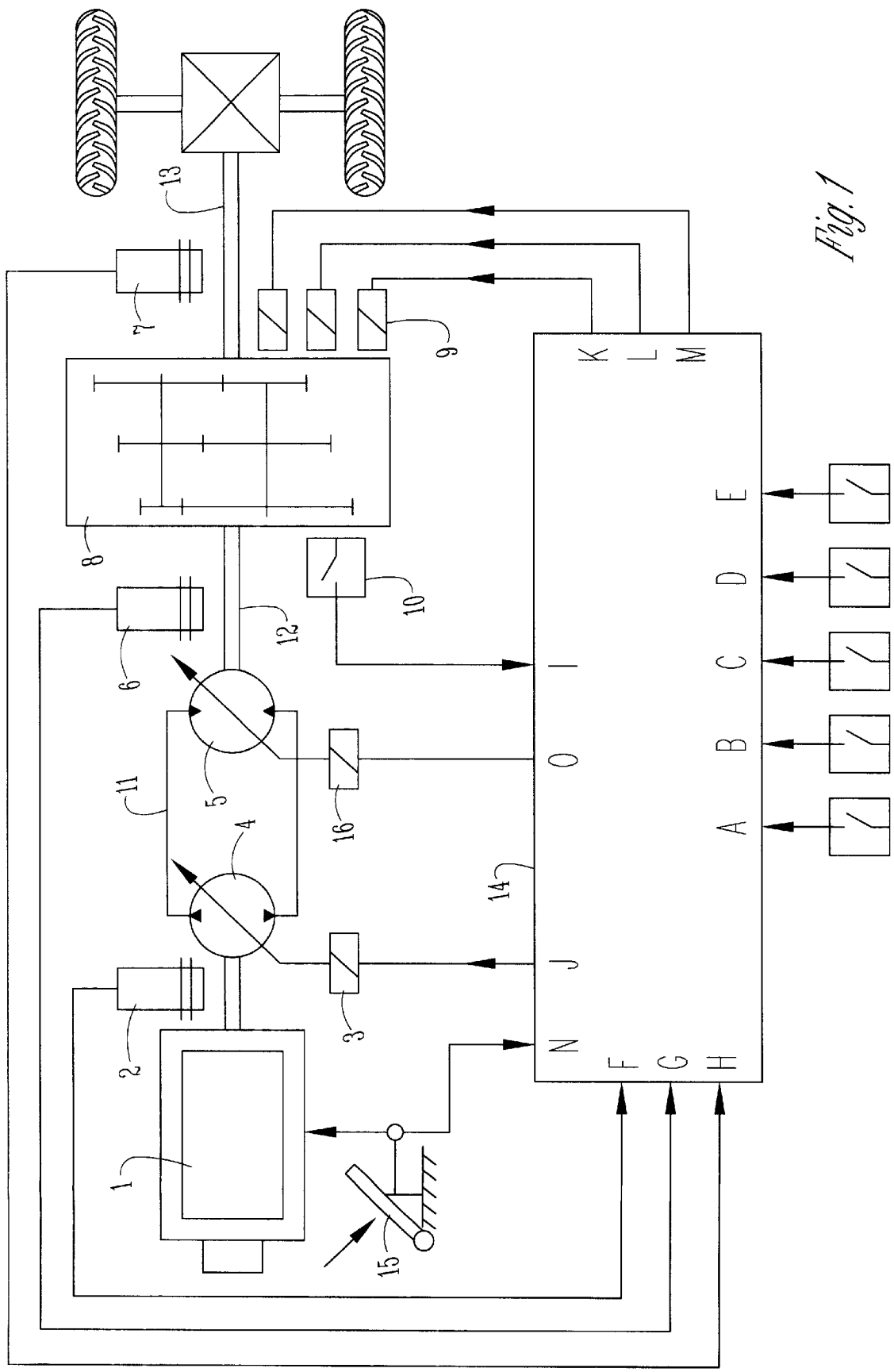
FIG. 1 shows a schematic view of an embodiment of the drive train.

FIG. 1 shows an embodiment of the drive train. The drive train comprises an internal combustion engine 1, the speed of which can be controlled by means of a mechanical link to an accelerator pedal 15. The adjustment of the volumetric delivery, i.e. the pivoting angle, of the hydraulic pump 4 coupled to the internal combustion engine takes place via a proportional valve 3, the actuating signal J of which is generated by a control unit 14 in dependence on the speed of the internal combustion engine 1, which also corresponds to the speed of the hydraulic pump 4. This speed is picked up by a speed sensor 2 and fed to the input F of the control unit. The oil delivered by the hydraulic pump 4 circulates in a closed circuit 11 and thereby drives a hydraulic motor 5. The setting of the volumetric delivery passing through the hydraulic motor 5, and consequently the difference in speed of the hydraulic pump and the hydraulic motor, can also take place by means of an adjusting device or a proportional valve 16, the actuating signal 0 of which can be generated in a way corresponding to the actuating signal J.

The shaft 12 of the hydraulic motor 5 is coupled to a mechanical, manually shifted gearbox 8. The individual transmission stages of the gearbox 8 are activated by means of actuating devices 9, in particular by means of valves or electromagnets of the control unit 14, and disengaged again by means of spring force as soon as a corresponding switching signal of the control unit (LM or N) is reset, and the gearbox 8 is operated loadfree by means of the adjustment of the hydraulic-pump volumetric delivery, determined by the actuating signal J. Loadfree operation can generally also take place by means of the corresponding adjustment of the volume in the hydraulic motor 5, determined by the actuating signal 0. A switch 10 at the gearbox 8 supplies information 5 I, from which it is evident whether the gearbox is in the neutral position or a mechanical gear is engaged. For controlling the electronic synchronization of the gearbox 8, two speed sensors 6 and 7 are located at the input shaft 12 and output shaft 13, respectively, of the mechanical gearbox 8. These respectively measure the input speed and output speed. The connection of the gearbox 8 to the vehicle axle takes place via the mechanical output shaft 13.

The controlling of the preferred embodiment described of the drive train takes place as already described above.

Figure 2:
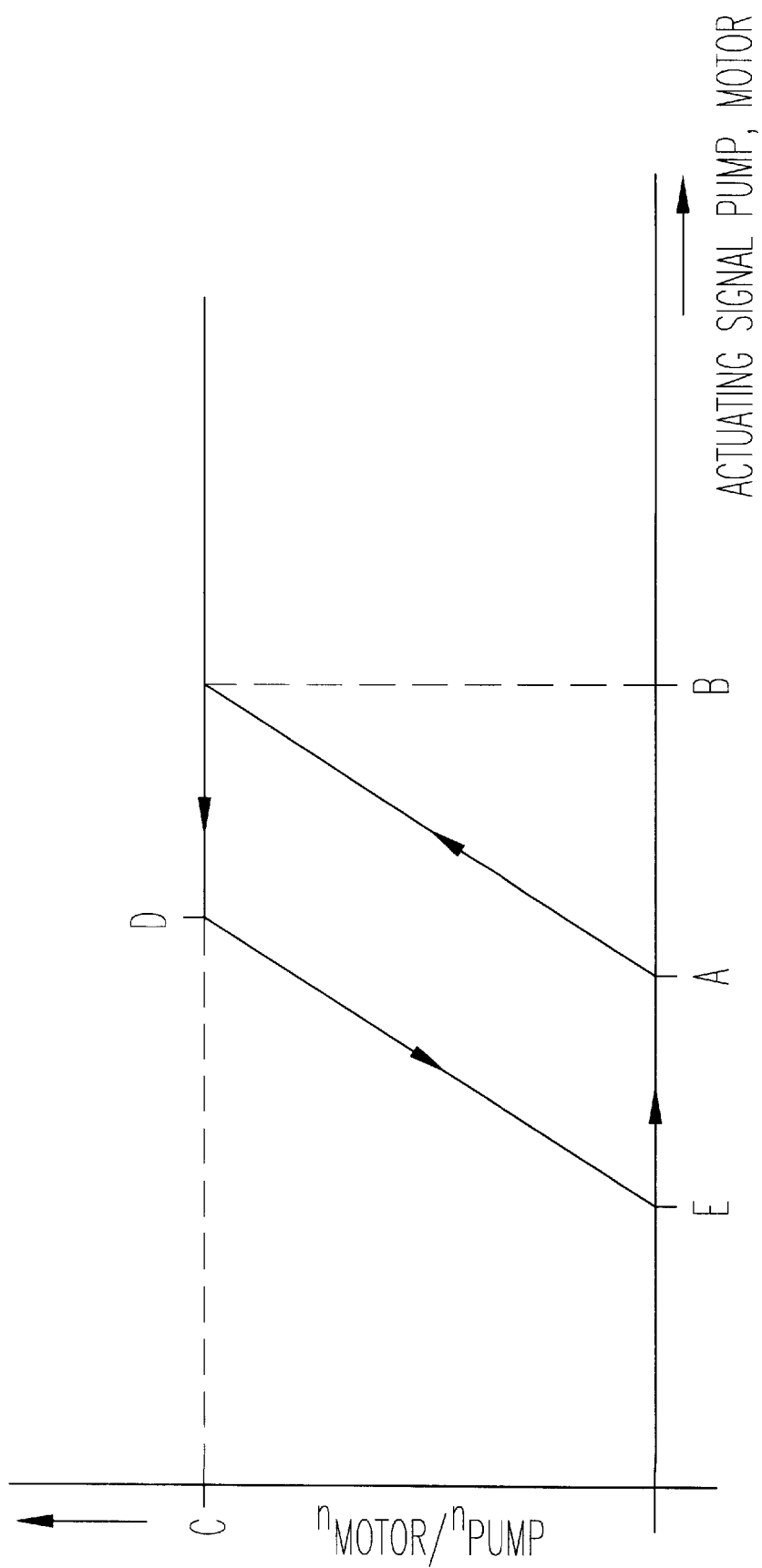
FIG. 2 shows a diagram with the characteristic curve.

FIG. 2 diagrammatically shows the profile of the characteristic curves for controlling the drive train in the way according to the invention, in particular the drive train of the embodiment of FIG. 1.

The x-axis designates the magnitude of the actuating signal, the y-axis designates the speed ratio of the hydraulic motor to the hydraulic pump. The profile of the characteristic curve is obtained from the speed ratio of the hydraulic motor to the hydraulic pump in dependence on the actuating signal to the adjusting device of the hydraulic pump and/or the hydraulic motor for a loadfree state of operation. The speed of the internal combustion engine being kept constant during the recording of the characteristic curve in the form of a learning curve during the set-up 20 procedure. The individual points of the characteristic curve (A, B, C, D, E) are obtained from the design sizes of the units as well as the hysteresis characteristics of the adjusting devices of the hydraulic-pump and/or hydraulic-motor volumetric delivery.

As long as the control unit does not output an adjusting signal, the pivoting angle of the hydraulic pump is in the central position (zero stroke) and the pivoting angle of the hydraulic motor is in a position which corresponds to the maximum flow rating. In the course of the set-up procedure, the pivoting angle of the hydraulic pump 4 is adjusted over the entire range and subsequently the pivoting angle of the hydraulic motor is brought into the end position which corresponds to the minimum flow rating. The starting point A of the drive train supplies information on the dead band of the adjusting device. The maximum achievable speed ratio C is achieved with the maximum pivoting angle of the hydraulic pump and the minimum pivoting angle of the hydraulic motor. On the basis of this value, the control unit 14 can determine the respectively maximum synchronous speed of the hydraulic motor in dependence on the actuating signal and the hydraulic-pump speed. Controlling the drive train then takes place as described above.

It is therefore seen that this invention will achieve at least its stated objectives.

We claim:

1. A drive train for a vehicle which has an internal combustion engine (1), a clutchless gearbox (8), a control unit (14) connected to the gearbox (8) for shifting the same, a hydrostatic drive (4, 5) and a hydraulic pump (4) and a hydraulic motor (5) connected in a closed circuit 10 (11), comprising, the control unit (14) being operationally connected by actuating signals (J, 0) to an adjusting device (9) on the gearbox (8) and adjusting devices (16, 3) on the motor and pump, the control unit being programmed by a characteristic curve representing a speed ratio of the hydraulic motor (5) to the hydraulic pump (4) to calculate a maximum electronic synchronous speed of the hydraulic motor to the hydraulic pump to create a loadfree state of the gearbox (8) by controlling the adjusting devices for the hydraulic pump (4) and the gearbox (8).

2. A drive train according to claim 1, characterized in that the characteristic curve is determined in the form of a learning curve as a set-up before putting the drive train into operation and is stored in the control unit (14), the actuating signals (J, 0) to the adjusting devices (3, 16) of the hydraulic pump (4) and/or hydraulic motor (5) so that the actuating signals (J, 0) can be continuously increased until the maximum speed ratio of the hydraulic motor to the hydraulic pump is reached.

3. A drive train according to claim 1, characterized in that a volumetric fluid output of the hydraulic pump (4) is adjusted by means of a proportional valve (3), wherein a required actuating signal (J) which is supplied by the control unit (14) in response to a setpoint input data influenced by a drive speed of the internal combustion engine (1), which is transmitted to the control unit (14) by means of a first speed sensor (2).

4. A drive train according to claim 3, characterized in that a switch (10) delivers to the control unit (14) a signal as to whether the gearbox (8) is in a neutral or gear engaged position.

5. A drive train according to claim 4, characterized in that the actuating devices (9) are valves or electromagnets which can be activated by the control unit (14) and disengaged again by means of spring force as soon as a corresponding switching signal (K, L, M) of the control unit (14) is reset and the gearbox (8) is brought by the control system into a loadfree state by means of the actuating signal (J) determined on the basis of the characteristic curve.

6. A drive train according to claim 3, characterized in that a second speed sensor (6), is provided for measuring the input speed of the gearbox (8), and a third speed sensor (7), for measuring the output speed of the gearbox (8), is provided for the electronic synchronization of the gearbox (8).

7. A method of controlling a drive train having an internal combustion engine (1), a clutchless gearbox (8) without a mechanical synchronizing device and a hydrostatic drive (4, 5) with a hydraulic pump (4), a hydraulic motor (5) and a control unit (14), characterized in that the control unit (14) calculates a maximum achievable synchronous speed of the hydraulic motor (5) by means of a characteristic curve which represents a speed ratio of the hydraulic motor (5) to the hydraulic pump (4) in response to an actuating signal to an adjusting device of the hydraulic pump (4) and/or to an adjusting device of the hydraulic motor (5) to create a loadfree state of the gearbox (8).

8. The method according to claim 7, characterized in that the control unit (14) activates actuating devices (9) for transmission stages of the gearbox (8) in a way corresponding to a desired operating point on the characteristic curve.

9. The method according to claim 7, characterized in that the characteristic curve is recorded in the form of a learning curve as a set-up at least for each new hydrostatic drive.

10. The method according to claim 9, characterized in that the characteristic curve is corrected in running operation, to compensate in particular for wear or aging-related changes of the hydrostatic drive (4, 5).

11. The method according to claim 8, characterized in that the respectively current transmission ratio during operation shifts the gearbox (8) into the neutral position, by de-activating a corresponding output (K, L, M) of the control unit (14) and by bringing the gearbox (8) into the loadfree state for a short time by changing the actuating signal (J) to the adjusting device (3) of the hydraulic pump (4).

12. The method according to claim 11, characterized in that the gearbox (8) is operated in the loadfree state for about 100 ms.

13. The method according to claim 7, characterized in that, when a neutral position of the gearbox (8) is sensed, the drive speed of the hydraulic motor (5) is rapidly brought by the control unit (14) to a synchronous speed required for a desired transmission stage of the gearbox (8) on the basis of an actuating signal (J, 0) which is derived from the learning curve and determines the volumetric fluid output of the hydraulic pump (4) and/or hydraulic motor (5).

* * * * *